United States Patent [19]
Zell

[11] 3,836,115
[45] Sept. 17, 1974

[54] VARIABLE LENGTH VALVE

[75] Inventor: Felician A. Zell, Chicago, Ill.

[73] Assignee: Vapor Corporation, Chicago, Ill.

[22] Filed: Aug. 30, 1973

[21] Appl. No.: 393,147

[52] U.S. Cl. .................... 251/150, 285/32, 137/798
[51] Int. Cl. ............................................. F16k 51/00
[58] Field of Search ........... 251/148, 150, 151, 152; 285/32, 298, 302, 405, 410, 411, 412, 414, 31; 137/219, 15, 315, 798, 799

[56] References Cited
UNITED STATES PATENTS

| | | | |
|---|---|---|---|
| 146,314 | 1/1874 | Case et al. | 137/315 |
| 870,557 | 11/1907 | Haus | 285/414 |
| 1,308,853 | 7/1919 | McVoy | 285/32 |
| 1,820,656 | 8/1931 | Ford | 285/31 |
| 2,511,212 | 6/1950 | Lee | 285/410 X |
| 3,356,332 | 12/1967 | Philippe | 251/150 |
| 3,380,469 | 4/1968 | Salerno et al. | 137/219 |
| 3,603,617 | 9/1971 | Lochridge | 285/31 X |

*Primary Examiner*—William R. Cline
*Attorney, Agent, or Firm*—Lloyd L. Zickert

[57] ABSTRACT

An inline fluid valve with the ability to change length for installation needs by having a threaded flange and collar at one end whereby turning the collar relative the flange provides variability of the distance between valve inlet and outlet end surfaces.

6 Claims, 3 Drawing Figures

VARIABLE LENGTH VALVE

The present invention relates to inline fluid valves and more particularly to an inline fluid valve assembly having a variable length between inlet and outlet end surfaces.

In certain aircraft, air bleed valves installed on an engine must mate closely with downstream ducts located on and passing through the nacelle. In an engine/nacelle installation, the nacelle and overboard ducting flange are not always a fixed distance from the outlet flange of the valve, thereby creating a variable gap that needs to be filled. Heretofore, this variable gap has been filled by an expansion joint, usually of the bellows type. Such expansion joints have a minimum length beyond which they are not effective. Also, the flexibility of bellows type expansion joints destroys any stress load carrying or transmitting capacity inherent in a rigid valve/ducting assembly.

The present invention is comprised of a valve body having aligned inlet and outlet end surfaces, a cylindrical flange on one end of the valve body, and a collar having a complementary cylindrical surface which mates with the flange surface and is capable of moving longitudinally along the flange surface thereby providing variability of the distance between valve inlet and outlet end surfaces.

Accordingly, it is an object of the invention to provide a new and improved variable length inline fluid valve.

A further object of the present invention is to combine an expansion joint and an inline fluid valve in a single unit so variability also exists when the additional length necessary is smaller than the minimum thickness of heretofore existing bellows expansion joints.

Another object of this invention is to provide a variable length valve which is rigid and capable of withstanding or transmitting stress loads when in an extended position unlike a valve heretofore combined with a flexible bellows expansion joint.

Another object of the invention is in the provision of providing continuous variability of the length of the valve, in apposition to more limited discrete variability, throughout the range of extension necessary for installation needs.

A further object of the invention is to provide means for preventing complete detachment of the adjustable member of the device.

Other objects, features and advantages of the invention will be apparent from the following detailed disclosure, taken in conjunction with the accompanying sheet of drawings, wherein like reference numerals refer to like parts, in which.

Figure 1:
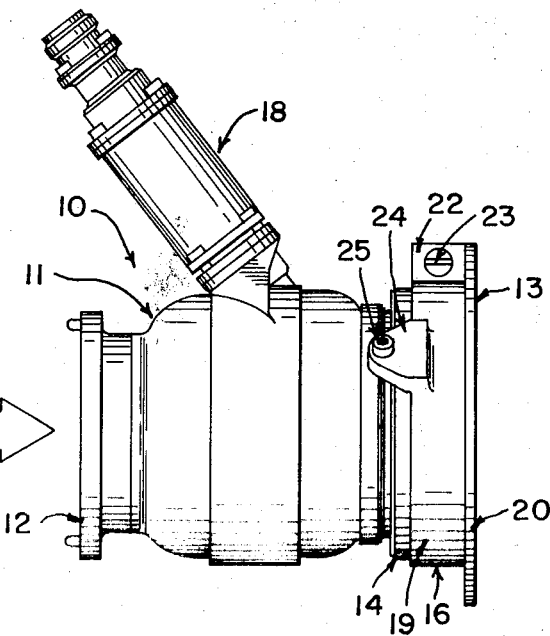
FIG. 1 is a side elevational view of an inline valve assembly showing the device enabling the length of the valve between inlet and outlet end surfaces to be varied.

Referring now to the drawings and particularly to FIG. 1, a variable length valve 10, as a preferred embodiment of the invention, is illustrated. The valve includes a tubular valve body 11 having axially aligned and parallel arranged inlet and outlet end surfaces 12 and 13 at the inlet and outlet thereof. It can be appreciated that any suitable regulation means including a sleeve valve or a poppet valve such as disclosed in U.S. Pat. 3,380,469 by P. G. Salerno et al, assigned to Vapor Corporation, Chicago, Illinois, may be employed in the valve body of the present invention. The means for regulation included may be operated by solenoid 18 as well as by other suitable devices. The inlet end surface 12 on one end of the tubular body 11 is fixed and adapted to be connected to suitable inlet ducting. A cylindrical flange 14 is suitably mounted on the other end of the valve body and externally threaded at 15. A split collar 16, internally threaded at 17, threadedly engages the flange 14 and is movable therealong by rotating the collar relative the flange.

The collar 16 includes a cylindrical portion 19 having the internal threading 17 and a radially extending rim having the outlet end surface 13. Turning the collar 16 relative the valve body flange 14 moves the collar 16 longitudinally along the flange 14 providing infinite variability of distance between the inlet end surface 12 on the valve body 11 and the outlet end surface 13 located on the collar 16 within the limits needed for the installation of the valve in its environment.

Figure 2:
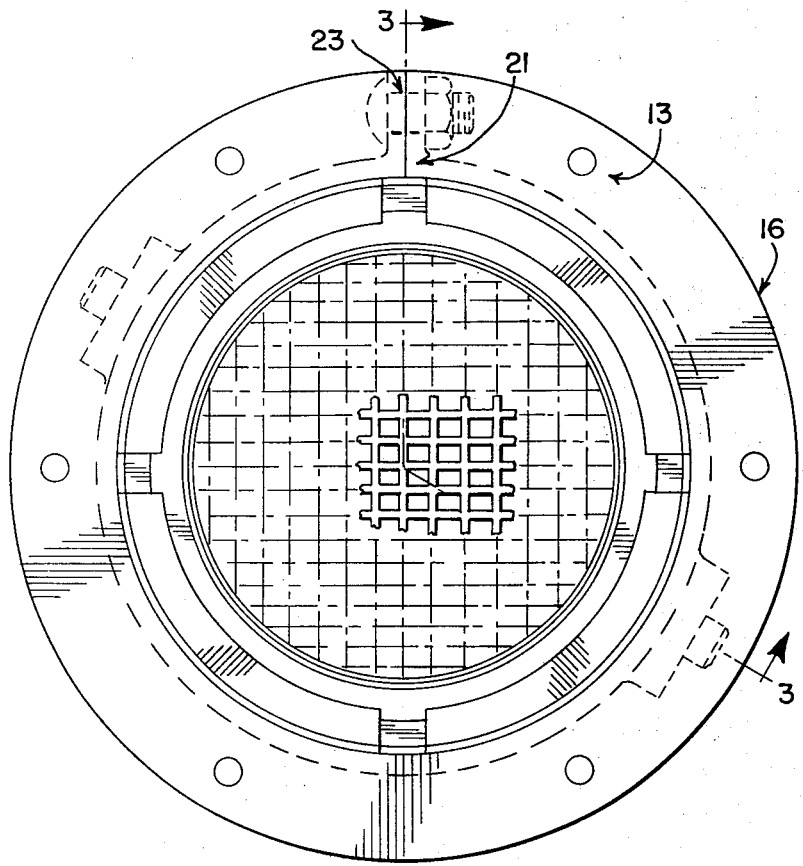
FIG. 2 is a right-hand end elevational view of the valve in FIG. 1.

As seen most clearly in FIG. 2, the collar 16 is split at 21 for contraction and expansion of the threaded surface 17. This provides the ability to lock the collar 16 onto the valve body flange 14 by contracting threaded surface 17 onto threaded surface 15 when the inlet end surface 12 and the outlet end surface 13 are the desired distance apart. The split 21 is defined by opposed ears 22, through which holes are formed to receive a nut and bolt fastener 23. It should be appreciated that any suitable fastener may be used which will provide means for securing collar 16 onto valve body flange 14. Loosening of the fastener allows rotation of the collar on the flange, while tightening of the fastener locks the collar in place. It should also be appreciated that while the preferred embodiment shown has the collar 16 and valve body flange 14 on the downstream or outlet side of the valve, the collar 16 and valve body flange 14 may also be located on the upstream or inlet side of the valve.

Figure 3:
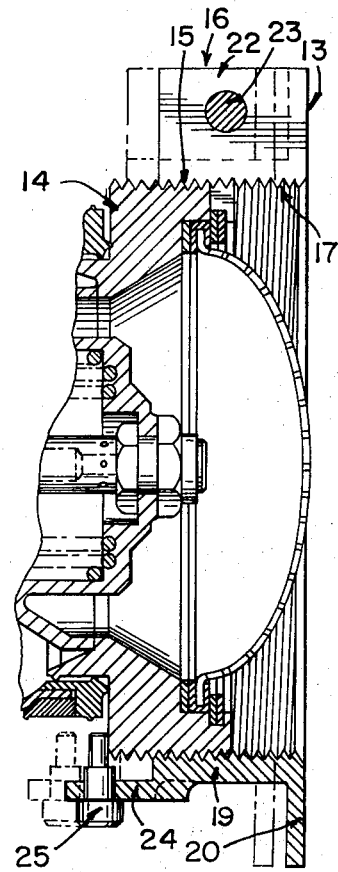
FIG. 3 is a fragmentary sectional view taken substantially along line 3—3 of FIG. 2.

In order to prevent complete disengagement of collar 16 from valve body flange 14 and limit the maximum effective adjustment to maintain a sound engagement between the collar and flange, lug 24 extends rearward on the collar 16 and a stop screw 25 is mounted on and through the lug 24 to coact with the rear side of valve body flange 14. When collar 16 is turned to the longest desired distance between the inlet end surface 12 and the outlet end surface 13 as shown in full lines in FIG. 3, the stop screw stops further movement of collar 16 relative to the flange and prevents complete disengagement therefrom. Movement of stop screw 25 outward from lug 24 eliminates coaction of the stop screw 25 and valve body flange 14 allowing disengagement of the collar 16 from the valve body 11 and flange 14.

While not shown, a suitable sealing ring would be mounted between the collar and flange to minimize leakage.

It will be understood that modifications and variations may be effected without departing from the scope of the novel concepts of the present invention, but it is understood that this application is limited only by the scope of the appended claims.

I claim:

1. A variable length inline fluid valve comprising a tubular valve body having aligned inlet and outlet openings, a first end surface defined at one of said openings, means within the body for regulating fluid flow therethrough, a flange integrally formed on said valve body at the other of said openings having a cylindrical surface, a collar having a complementary cylindrical surface mating with said flange surface and defining a second end surface opposite said first end surface, whereby movement of said collar longitudinally along said flange surface provides variability of the distance between said end surfaces, and means for locking said collar in adjusted position along the flange, said locking means including a split on said collar allowing expansion and contraction, and a fastener at said split which when tightened contracts the circumference of said collar locking it to said flange.

2. A variable length inline fluid valve as in claim 1, wherein said flange surface is internal of said collar surface.

3. A variable length inline fluid valve as in claim 2, wherein the complementary surfaces of said flange and said collar are threaded so turning said collar relative said flange provides substantially infinite variability of the distance between said inlet and outlet end surfaces.

4. A variable length inline fluid valve as in claim 2, and means for limiting collar longitudinal travel and preventing complete disengagement from said flange.

5. A variable length inline fluid valve as in claim 4, wherein said means includes a lug extending from said collar and a stop screw mounted thereon for engagement with said flange.

6. In a variable length inline fluid valve having a tubular valve body with aligned inlet and outlet openings, a first end surface at one of said openings and means within the body for regulating fluid flow therethrough, the improvement in means defining a second end surface opposite the first end surface which includes a flange on said valve body having an outer threaded surface, a split collar having an inner threaded surface mating with said flange surface whereby turning said collar relative said flange provides substantially infinite variability of the distance between said first and second end surfaces, fastener means for the collar which when tightened contracts the threaded surface of said split collar for locking said split collar at a given position along said flange, and a stop screw mounted on a lug extending from said collar and coacting with said flange for limiting collar longitudinal travel and preventing complete disengagement thereof from said flange.

* * * * *